Sept. 1, 1942.   G. W. LUTZ   2,294,470
ROTARY CULTIVATOR
Filed Aug. 29, 1940   3 Sheets-Sheet 2
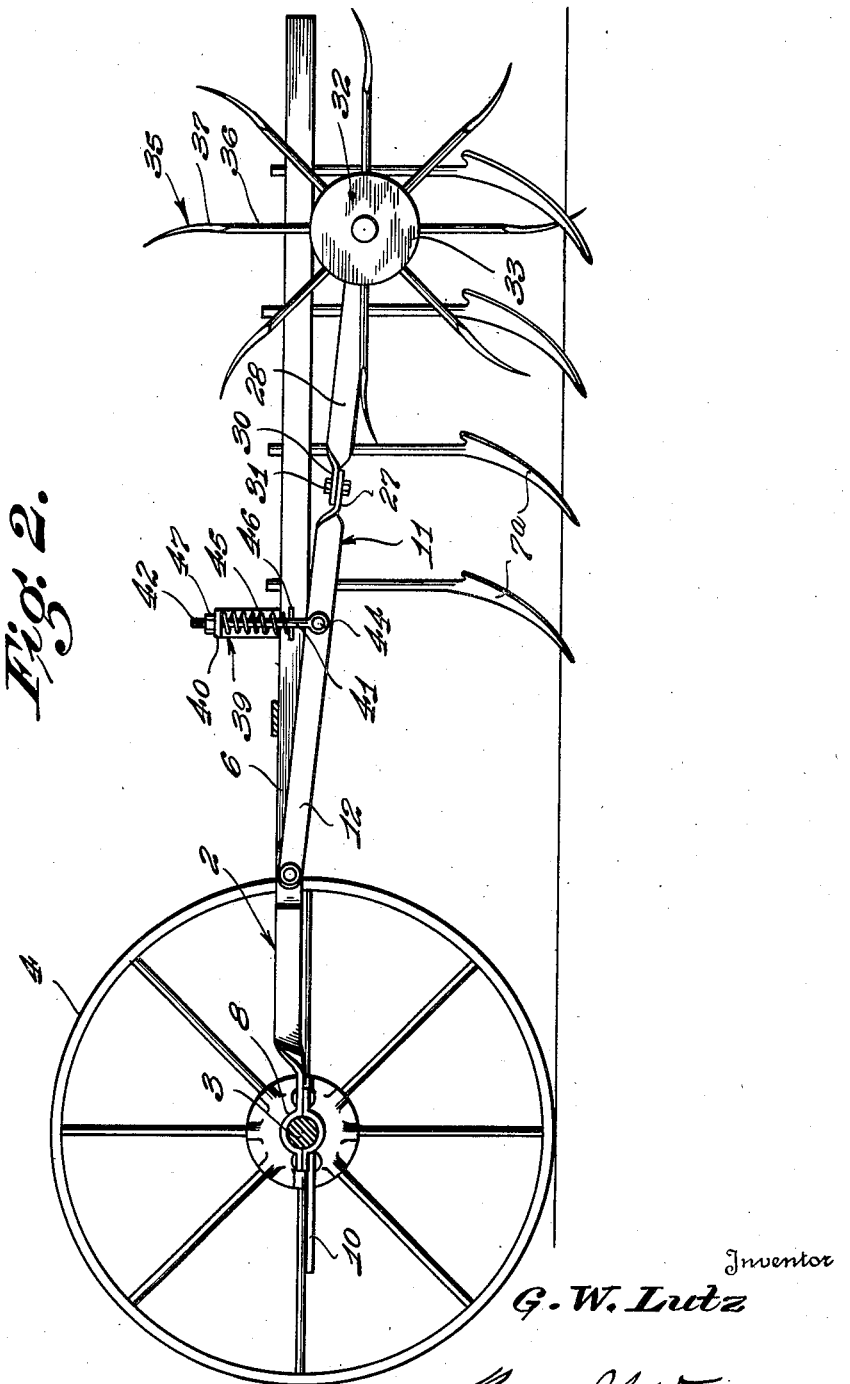

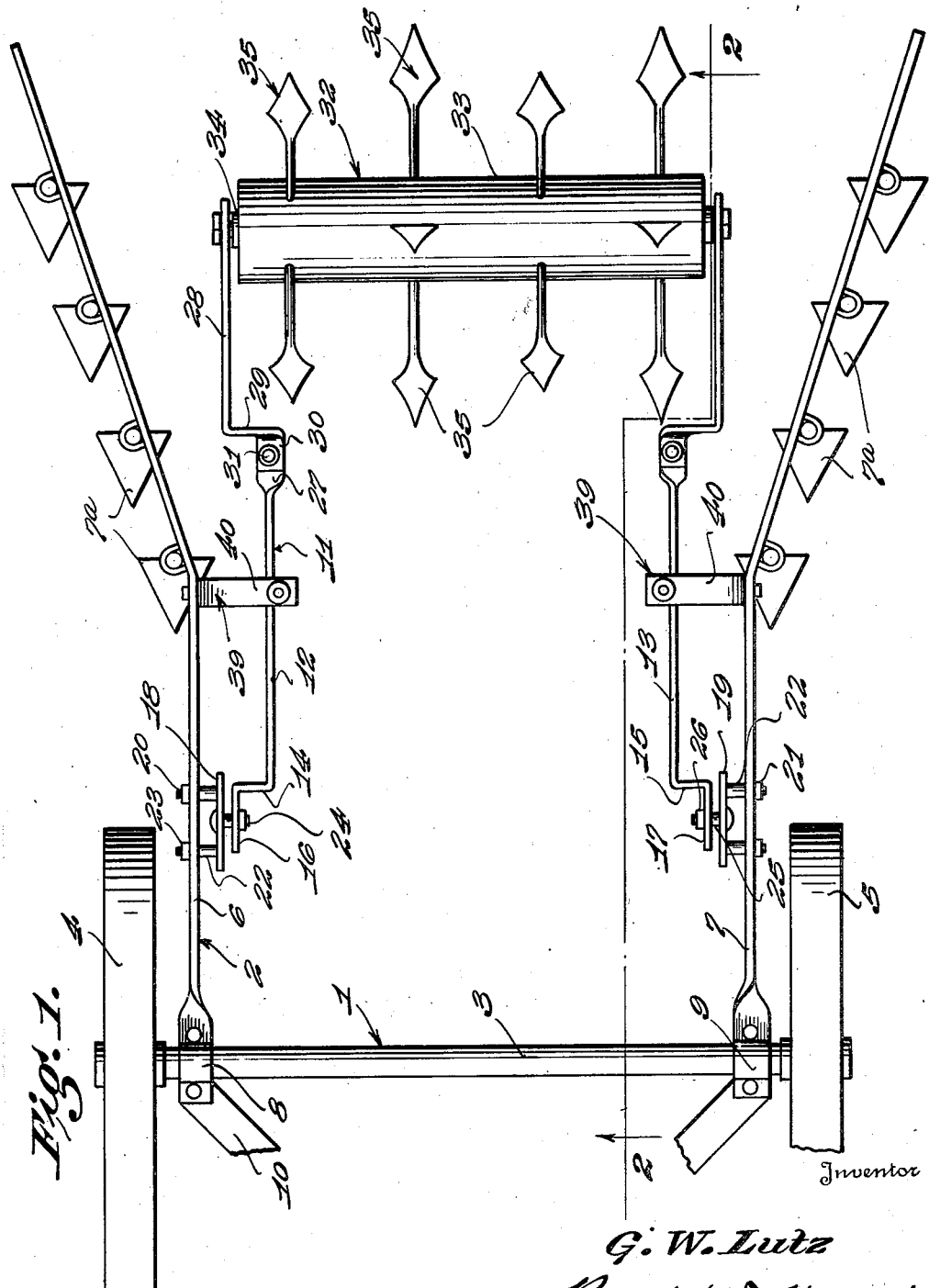

Sept. 1, 1942.　　　　G. W. LUTZ　　　　2,294,470
ROTARY CULTIVATOR
Filed Aug. 29, 1940　　　　3 Sheets-Sheet 3
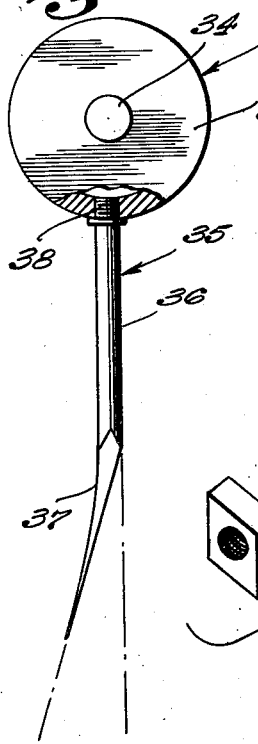
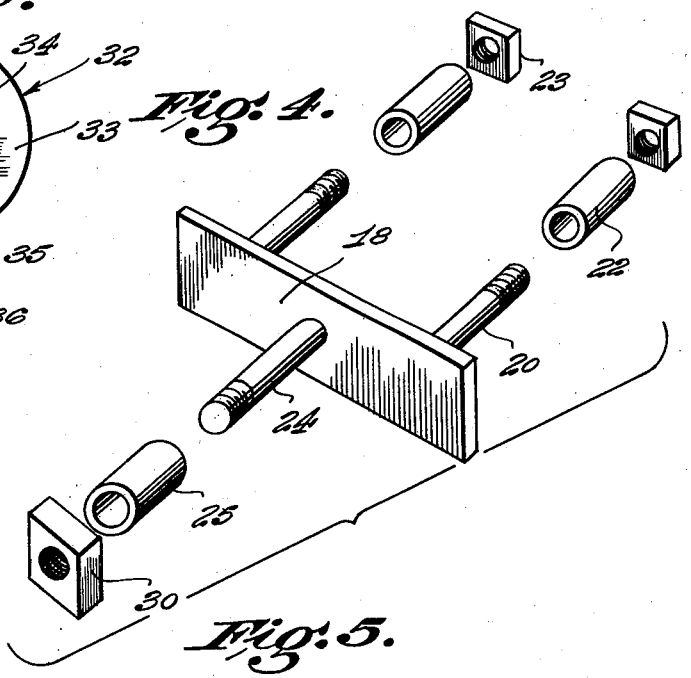
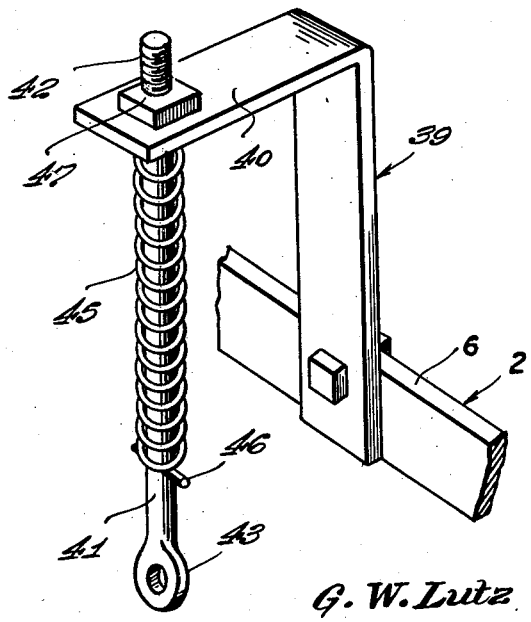
Inventor
G. W. Lutz
By Ross J. Woodward
Attorney Patented Sept. 1, 1942

2,294,470

UNITED STATES PATENT OFFICE 2,294,470

ROTARY CULTIVATOR

Glenn W. Lutz, Phillipsburg, Ohio

Application August 29, 1940, Serial No. 354,751

3 Claims. (Cl. 97—179)

This invention relates to an improved cultivator wheel and seeks, among other objects, to provide a device of this character which will be highly efficient in use for cultivating rows of corn, tomatoes, tobacco, and the like.

Another object of the invention is to provide a cultivator wheel wherein means is employed for permitting ready adjustment.

A further object of the invention is to provide a cultivator wheel which is adapted for use with cultivators of the horse-drawn or tractor drawn type.

A still further object of the invention is to provide a cultivator wherein the cultivator elements employed are arranged in staggered relation about the drum or hub of the wheel so that full and effective cultivation will be assured.

And still another object of the invention is to provide a cultivator wheel of this nature employing improved mounting means having springs for yieldably resisting upward movement of the wheel as the same moves over the ground.

Other and incidental objects of the invention not mentioned hereinbefore will become apparent during the course of the following description.

In the drawings:

Figure 1 is a top plan view of a cultivator equipped with my improved cultivator wheel.

Figure 2 is a longitudinal sectional view on the line 2—2 of Figure 1, looking in the direction of the arrows.

Figure 3 is an enlarged detail elevation, partly in section, showing the hub of the cultivator wheel and one of the cultivator elements employed.

Figure 4 is an enlarged detail perspective view showing one of the pivot bearings employed.

Figure 5 is an enlarged detail perspective view showing one of the spring mountings.

Referring now more particularly to the accompanying drawings, wherein similar numerals of reference will be seen to designate like parts throughout the views, the numeral 1 indicates a cultivator having a frame 2, said frame including an axle 3, ground wheels 4 and 5, and side bars 6 and 7. The side bars diverge from their mid-points toward their corresponding free ends and carry cultivator shares 7a, said cultivator shares being of conventional construction and being arranged in a spaced series longitudinally of the side bars.

The side bars 6 and 7 are connected to the axle 3, near its opposite ends, by bearings 8 and 9. Draft members 10 are shown fragmentarily and are adapted for connection with a tractor or a span of horses.

Associated with the frame 2 of the cultivator 1 is a wheel frame 11, said frame including side bars 12 and 13. The side bars 12 and 13 have outwardly offset corresponding inner end portions 14 and 15 and said offset portions are projected to define terminal portions 16 and 17. Mounted on the inner faces of the side bars 6 and 7 of the frame 2 are pivot bearing plates 18 and 19, said pivot bearing plates being held in place on the respective side bars by means of pairs of bolts 20 and 21. Spacing sleeves 22 surround the bolts 21 for effectively spacing the plate 19 from the side bars. Nuts 23 are screwed on the ends of the bolts and, of course, retain the pivot bearing plates 18 and 19 in proper operative position. As best seen in Figure 4 of the drawings, the pivot bearing plates carry pivot bolts 24. Surrounding the pivot bolts 24 are bearing sleeves 25 which serve the purpose of effectively spacing the portions 16 and 17 from the faces of said pivot bearing plates 18 and 19. Nuts 26 effectively retain the portions 16 and 17 in pivotal engagement with the bolts 24 so that an effective pivotal mounting for the frame 11 on the frame 2 will be assured.

The side bars 12 and 13 have their corresponding rear end portions twisted to define flat hinge plates 27. The hinge plates have associated therewith wheel supporting plates 28, said wheel supporting plates having inwardly offset portions 29 which terminate in hinge plates 30. Hinge bolts 31 hingedly connect the portions 30 with the hinge plates 27. It will now be understood that the wheel frame 11 may be raised and lowered about the pivot bolts 24. The hinge bolts 31, in addition, provide means for further adjustment.

Mounted between the wheel supporting plates 28 is a cultivator wheel, indicated generally by the numeral 32. The cultivator wheel 32 includes a drum or hub 33 mounted on a shaft 34. The shaft has end portions journaled for rotation in the ends of the side bars 28. The cultivator wheel also includes cultivator elements 35, said elements being arranged in staggered relation transversely of the hub or drum and also being arranged in circumferentially spaced series. As seen in Figure 3 of the drawings, each of the cultivator elements includes a straight shank 36 and a laterally directed digging portion or spade 37, said digging portion or spade being disposed at an angle of substantially ten degrees from the axis of the straight portion 36. It should be understood, however, that the spades or digging portions may be arranged at any desired angle with respect to the axes of the straight portions. As shown in Figure 3, the straight portions are provided with threaded upper ends 38 which are screwed into threaded openings in the hub 33. It is obvious that the cultivator elements may be secured to the hub in any other suitable manner.

In order to provide a resilient connection between the wheel frame 11 and the cultivator frome 2, I employ structure including a pair of brackets 39, said brackets being of inverted L-shape and being mounted in opposed relation on the side bars 6 and 7 near their mid-points. The brackets 39 include arms 40 which project in overhanging relation with respect to the side bars 12 and 13 of the wheel frame 11 and are provided with openings near their corresponding free ends. Connecting rods 41 are associated with the brackets 39 and have threaded upper end portions 42 extending through the openings in the ends of the arms 40. At their corresponding lower ends the ribs 41 are flattened and apertured to define eyes 43. Bolts 44 extend through the eyes and through the side bars 12 and 13 of the wheel frame 11 for pivotally connecting the rods 41 with said wheel frame. As best seen typically in Figure 5, a spring 45 surrounds each of the rods and is confined beneath the under surfaces of the arms 40 and pins 46, which extend transversely through rods 41 near their corresponding lower ends. It will now be understood that the rods 41, together with the springs 45, provide a resilient connection between the wheel frame 11 and the cultivator frame 2 so that the cultivator wheel 32 will be yieldably engaged with the surface of the ground. Nuts 47 are screwed on the threaded upper ends 42 and are adjustable for varying the tension of the spring.

It will be understood that I have provided a highly efficient rotary cultivator wheel which is simple in construction and capable of manufacture at low cost. It is easy to install and remove from a cultivator and, as previously explained, is capable of several adjustments, which adjustments may be made with the utmost facility. It is possible to raise and lower the wheel with respect to the cultivator frame by adjustment of the nuts 47. The device lends itself equally well for use in connection with a tractor or as a horse-drawn implement.

Having thus described the invention, what is claimed is:

1. In a cultivator wheel, a hub, cultivator elements carried on the hub, a wheel frame, means pivotally connecting the wheel frame with a cultivator, said means including pivot bolts, bearing sleeves on the pivot bolts, bearing plates, spacing sleeves, and means for connecting the bearing plates with the cultivator.

2. In a cultivator, a main frame, a wheel having a hub, cultivator elements carried by the hub, a wheel frame, means pivotally connecting the wheel frame with the main frame whereby said wheel frame will be permitted to have vertical movement with respect to the main frame, and means yieldably resisting upward movement of the wheel frame with respect to the main frame, said means being adjustable for raising the wheel frame on the main frame, said means including a bracket mounted vertically on the main frame and having an arm extending inwardly of the main frame, a connecting rod mounted on the wheel frame and extending upwardly therefrom with its upper portion extending through an opening in the side arm of the bracket, a spring surrounding the connecting rod, a pin extending through said rod and engaging the lower end of the spring for confining the spring between the side arm of the bracket and the lower end portion of said connecting rod, and a nut screwed on the rod for engagement with the upper face of the bracket arm and tensioning the spring when tightened.

3. In combination with a cultivator frame having side bars, a cultivator wheel including a hub, a wheel frame having side arms, and mounting means pivotally connecting the side arms of the wheel frame with companion side bars of the cultivator frame, and means yieldably resisting upward movement of the wheel frame with respect to the cultivator frame, the mounting means each consisting of a plate, bolts projecting from the outer side face of said plate and through the cultivator bar, spacers about said bolts between the plate and the cultivator bar, nuts threaded upon outer ends of said bolts, a stem projecting from the inner side face of said plate and through the side arm and constituting a pivot for the same, a spacer about the pin between the plate and the side bar, and a nut threaded on the stem for holding the side bar and the spacer thereon.

GLENN W. LUTZ.